Patented Sept. 8, 1942

2,295,235

UNITED STATES PATENT OFFICE 2,295,235

PROCESS FOR PRODUCING ROSIN

Jesse O. Reed, Washington, D. C., assignor to Claude R. Wickard, as Secretary of Agriculture of the United States of America, and to his successors in office No Drawing. Application June 2, 1941, Serial No. 396,351

3 Claims. (Cl. 260—108)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a process of distilling crude oleoresin, and of producing a rosin containing no visible extraneous matter.

An object of my invention is to produce a clean and brilliant rosin in a simplified process in which the crude oleoresin is not refined preparatory to distillation.

Another object of my invention is the removal of water soluble materials in crude oleoresin by means of filtration, thereby producing a clean and brilliant rosin of an improved grade.

A further object of my invention is to convert crude oleoresin into turpentine and rosin as quickly as possible, and thereby decrease the possibility of producing a rosin containing oxidized products. Prolonged heating, settling, etc., commonly used in oleoresin refining processes promote the oxidation and isomerization of oleoresin preparatory to distillation.

Crude pine oleoresin is distilled, and rosin is produced mainly by two methods. The established method is to distill the crude oleoresin in its original state in a large vessel or directly fired still, and strain the refuse and fine dirt from the hot rosin after the distillation has been completed. The other method is to refine the crude oleoresin before distillation so that straining of the rosin is not necessary.

Rosin produced by the straining after distillation method has a cloudy appearance due to the inability of the cotton batting, which is used in the bottom of a strainer to remove not only the fine dirt, but small colored bodies which originally existed as water solubles in the water present in the crude oleoresin. A clean brilliant rosin, on the other hand, can be produced by reason of recent developments and improvements in processes in which the crude oleoresin is filtered and treated preparatory to distillation into turpentine and rosin. Little or no improvements have been made in the rosin obtained by straining after distillation. Maximum yields of rosin both with respect to quantity and grades have been obtained only by refining the crude oleoresin before distillation.

In some oleoresin refining processes, special consideration is given to the treatment of the oleoresin so that the water solubles contained in the water in the crude oleoresin are removed and a rosin free of undissolved small color bodies can be produced. In processes in which the rosin is strained it is difficult to make the molten rosin pass through a satisfactory filter medium. A filter medium through which the molten rosin may flow freely often removes only the coarser particles of extraneous matter from the rosin and allows the finer particles of extraneous matter to remain and form a cloudy rosin. If a thorough filtration of rosin is attempted, it will be found that the filter media necessary to remove all the visible material from the rosin will slow down the rate of filtration to the extent that the rosin may become cooled before it can be filtered.

In my experiments conducted in the filtration of the rosin in an oleoresin distillation process of the "batch" type, I have found it difficult to obtain a "dry," or water-free rosin before and after filtration. If water is present in rosin after filtration, it becomes opaque and unmarketable. My experiments also show the necessity for having a "dry," or water-free rosin, or molten oleoresin in order to filter. Not only does the filter medium function more satisfactorily and give a more rapid rate of filtration with "dry" heated oleoresin, but the color bodies existing originally as water-solubles, are removed by filtration. On the other hand, if rosin, or heated oleoresin, contains water when it is filtered, and then is heated so as to drive off the water present, it will be noticed that the color bodies remain in the reheated or filtered rosin, because these said color bodies were carried through the filter medium as water solubles dissolved in the water in the rosin. I have found that it is necessary, therefore, that the oleoresin, or rosin be "dry," or free of dissolved and entrained water, when filtered. The degree of cleanliness of the final product, viz. rosin, therefore, is dependent upon the "dryness" of the said heated oleoresin, or rosin, when filtered.

In my process of distilling crude oleoresin, the oleoresin is made "dry," or water-free, and can be readily filtered through filter media of various types, including paper. Filtration can be performed on the finished product, viz., rosin, but because of the more efficient results obtained, I prefer to filter the partially distilled heated oleoresin, and then continue heating the filtered product until the distillation is completed, and rosin is made.

In general, in carrying out the purpose of my invention, the crude oleoresin is melted and distilled in a vessel heated either by steam, direct fire, or both. The vessel can be fitted with a perforated basket, if desired, to retain the residue present in the original crude oleoresin within the still and not permit the residue to reach the filtering apparatus. Water or live steam is introduced when necessary, and at a rate to obtain maximum distillation efficiency. The turpentine is separated from the "low wines," or water portion of the distillate. It will be seen, therefore, that distillation of the turpentine from the crude oleoresin is conducted in accordance with the usual procedure.

When the normal progress of the distillation process reaches a preferred point, i. e., where 90% of the distillate is water and 10% is turpentine, the admission of water or steam to the distilled oleoresin in the vessel should be discontinued. Heat should be applied continuously, however, to this oleoresin, either through steam coils, steam jacket, or direct fire. Fresh turpentine, free of water, is then fed into a distillation vessel, either directly into the oleoresin, or in the form of a spray in a chamber and above the distilling oleoresin, so distributed that the entire boiling surface of the said oleoresin is reached uniformly. With the external sources of heat being applied to the oleoresin the fresh turpentine is fed slowly into a vessel. The admission of the turpentine into the hot mass of oleoresin not only dilutes the oleoresin, but causes an increase in the rate of distillation with a consequent removal of the water remaining therein. When this distillation reaches a point where little or no water is present in the distillate, the admission of turpentine into the vessel is discontinued, unless it is desired to add more turpentine to reduce the viscosity of the heated oleoresin, or rosin, and thereby facilitate filtration. At this stage of the distillation process the oleoresin is "dry," or water-free, and in a molten state. It is now ready to be filtered.

This water-free, molten, hot, diluted oleoresin, or rosin, may be filtered, preferably under pressure, preferably with filter aids, and through various filter media, including paper. Several methods are possible for producing the pressure required for filtration. One method is to use a pump between the distillation vessel and the filtering apparatus. A preferred method, however, is to employ the vapor pressure produced by the turpentine vapors that form in a vessel to force the heated oleoresin through the filtering apparatus. This procedure assists in cleaning the residue remaining in the distillation vessel.

The filtered oleoresin from the filtering apparatus, of any well-known type, is collected and redistilled in accordance with well-known practices. When all the turpentine is distilled off, the rosin is withdrawn from the vessel and run into containers as a finished product.

The filtered oleoresin need not be redistilled to yield turpentine and rosin, as described above, but can have a sufficient amount of turpentine remaining in it after filtration to act as a solvent and provide a product which in commerce can be handled in the same manner as other viscous liquids. The finished product obtained by either method of distillation will be bright and free of undissolved extraneous matter.

Having thus described my invention, what I claim for Letters Patent is:

1. A process for producing rosin, which comprises subjecting crude oleoresin to the action of heat, the while adding water, thereby distilling off and recovering turpentine present in the crude oleoresin until substantially 90% of the distillate is water and 10% is turpentine; thence subjecting the distilled oleoresin to the action of heat, the while removing water and adding fresh, water-free turpentine until substantially all of the water present in the distilled oleoresin is withdrawn, thereby forming a molten, water-free oleoresin; thence subjecting the molten, water-free oleoresin to pressure formed by turpentine vapors, thereby forcing the oleoresin through filter media; thence redistilling the filtered oleoresin until the turpentine is removed; and, thence collecting the rosin.

2. A process for producing rosin, which comprises subjecting crude oleoresin to the action of heat, the while adding water, thereby distilling off and recovering turpentine present in the crude oleoresin until substantially 90% of the distillate is water and 10% is turpentine; thence subjecting the distilled oleoresin to the action of heat, the while removing water and adding fresh, water-free turpentine in the form of a spray until substantially all of the water present in the distilled oleoresin is withdrawn, thereby forming a molten, water-free oleoresin, thence subjecting the molten, water-free oleoresin to pressure formed by turpentine vapors, thereby forcing the oleoresin through filter media; thence redistilling the filtered oleoresin until the turpentine is removed; and, thence collecting the rosin.

3. The hereinbefore described process of producing rosin, which comprises preliminarily heating and distilling crude oleoresin until substantially 90% of the distillate is water and 10% is turpentine, thence adding fresh, water-free turpentine directly and uniformly to the oleoresin, being heated, thereby diluting the oleoresin and increasing the rate of distillation with a consequent removal of water, continuing the addition of turpentine until the mass is substantially free of water; thence filtering the water-free oleoresin under pressure; thence redistilling the filtered oleoresin until the turpentine is removed; and, thence collecting the residue in the form of rosin.

JESSE O. REED.